(12) United States Patent
Miyamura et al.

(10) Patent No.: US 10,586,564 B1
(45) Date of Patent: Mar. 10, 2020

(54) SAFE HEAD POSITIONING BASED ON Y-POSITION VALUES IN TAPE DRIVE

(71) Applicant: International Business Machines Corporation, Armonk, NY (US)

(72) Inventors: Tsuyoshi Miyamura, Yokohama (JP); Tomoko Taketomi, Shinagawa (JP); Kazuhiro Tsuruta, Kanagawa (JP); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/254,744

(22) Filed: Jan. 23, 2019

(51) Int. Cl.
*G11B 5/09* (2006.01)
*G11B 5/584* (2006.01)
*G11B 20/12* (2006.01)
*G11B 5/008* (2006.01)

(52) U.S. Cl.
CPC .......... *G11B 5/584* (2013.01); *G11B 5/00813* (2013.01); *G11B 20/1201* (2013.01)

(58) Field of Classification Search
None
See application file for complete search history.

(56) References Cited

U.S. PATENT DOCUMENTS

| 7,245,450 | B1 * | 7/2007 | Cherubini | G11B 5/584 360/27 |
|---|---|---|---|---|
| 7,328,138 | B1 | 2/2008 | Trabert et al. | |
| 7,333,291 | B1 | 2/2008 | Fasen | |
| 7,623,318 | B1 | 11/2009 | Chliwnyj et al. | |
| 7,760,455 | B2 | 7/2010 | Kang et al. | |
| 8,582,224 | B1 | 11/2013 | Mahnad | |
| 9,640,209 | B1 | 5/2017 | Bui et al. | |
| 9,959,892 | B1 * | 5/2018 | Miyamura | G11B 20/1201 |
| 10,008,226 | B1 * | 6/2018 | Bui | G11B 5/5504 |
| 10,062,399 | B1 * | 8/2018 | Breuer | G11B 5/1871 |
| 2002/0006004 | A1 * | 1/2002 | Miyamura | G11B 5/00813 360/53 |
| 2010/0053801 | A1 * | 3/2010 | Katagiri | G11B 5/00834 360/77.12 |
| 2010/0067139 | A1 * | 3/2010 | Bates | G11B 5/584 360/71 |
| 2014/0327985 | A1 * | 11/2014 | Bui | G11B 15/43 360/71 |

OTHER PUBLICATIONS

Lantz et al., "Servo-Pattern Design and Track-Following Control for Nanometer Head Positioning on Flexible Tape Media", IEEE Transactions on Control Systems Technology, vol. 20, No. 2, Mar. 2012, 13 pages.

Cherubini et al., "High-Performance Servo Channel for Nanometer Head Positioning and Longitudinal Position Symbol Detection in Tape Systems", IEEE/ASME Transactions on Mechatronics, vol. 21, No. 2, Apr. 2016, 13 pages.

Unknown, "Servo Technology Enabling High Recording Density", Chapter 6, English Translation, JEITA Tape Storage Experts Committee / Tape System Technical Document, printed Mar. 7, 2018, 9 pages.

* cited by examiner

*Primary Examiner* — Peter Vincent Agustin
(74) *Attorney, Agent, or Firm* — Scott S. Dobson (57) ABSTRACT

A method and system for a controlling a head element of a tape drive is disclosed. Y-position values based on servo bands are identified. Control adjustments for the head element are determined based on the Y-position values and the direction of the current wrap.

12 Claims, 5 Drawing Sheets

SAFE HEAD POSITIONING BASED ON Y-POSITION VALUES IN TAPE DRIVE

BACKGROUND

The present disclosure is related to servo tape drives, and more specifically to head adjustment based on servo bands. A tape drive is a storage device that reads and writes data on a magnetic tape. Magnetic tape storage can be used for archival data storage, is fairly economical, and has reliable archival stability. A tape drive provides sequential access storage, and physically winds tape between reels to read a particular piece of data. Track following control can be important for the reliability of data both read and recorded from a tape drive.

SUMMARY

According to embodiments of the present disclosure, a method for controlling a head element of a tape drive is disclosed. The method includes identifying, during a wrap, a first y-position (YPOS) value based on a first servo band, a second YPOS value based on the first servo band, a third YPOS value based on a second servo band, and a fourth YPOS value based on the second servo band. It is determined that noise is present in the first servo band based on the first YPOS value and the second YPOS value. It is determined that noise is not identified in the second servo band based on the third YPOS value and the fourth YPOS value. One of the first YPOS value and the second YPOS value is selected based on the direction of the wrap. A control adjustment is performed based on the selected YPOS value.

Further disclosed herein are embodiments of a second method for controlling a head element of a tape drive. The method includes identifying, during a first wrap, a first set of y-position (YPOS) values based on a first servo band and a second set of YPOS values based on a second servo band. An offset based on the first and second set of YPOS values is calculated. The offset based on the first set and second set of YPOS values are compared to a reference offset. It is determined whether to perform a control adjustment using the YPOS values based on a direction of the first wrap and the comparison between the offset based on YPOS values and the reference offset.

Further disclosed herein are embodiments of a tape drive system. The system includes a head element having a first servo head configured to read information from a first servo band, a second servo head configured to read information from the first servo band, a third servo head configured to read information from a second servo band, and a fourth servo head configured to read information from the second servo band. The system further includes one or more processing circuits communicatively coupled to the first servo head, the second servo head, the third servo head, and the fourth servo head. The one or more processing circuits are configured to perform the above methods.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the spirit and scope of the invention.

DETAILED DESCRIPTION

Current servo tape drives utilize servo bands above and below each data band on tape to provide accurate positioning of the magnetic head of a tape drive for reading and writing data to data tracks within the data band. For example, a tape may contain 5 servo bands and 4 data bands. The width of data tracks on each data band may be very small. For example, some tape drives have track widths of 2 micrometers. The small width makes accurate placement of the head important so that data is read and written to the correct track. Head elements on the tape drive contain servo heads configured to read patterns written into the servo bands to determine whether the head element is accurately placed for writing to a data track in the data band. The head elements further contain one or more magnetic heads for reading and writing data on the data bands. Position values are determined based on signals from the servo heads as they read the patterns in the servo bands. The position values may be referred to as the y-position (YPOS) values. The YPOS values can be used to create a position error signal (PES) that is used to adjust the position of the head element for reading or writing to the tape.

Typically, servo tape drives use two servo heads, one on each side of a head element, to obtain two YPOS values (i.e., a YPOS value from the servo band above the data band and a YPOS value from the servo band below the data band). The two YPOS values may be referred to y-position 1 (YPOS1) and y-position 2 (YPOS 2). The PES may be calculated using the average value of YPOS1 and YPOS2. For example, the PES may be calculated using the following equation:

$$PES = \frac{YPOS1 + YPOS2}{2} - YPOS_{TARGET}$$

The target y-position ($YPOS_{TARGET}$) represents the YPOS where the head element is intended to be placed. $YPOS_{TARGET}$ may be identified during the manufacturing process. As the PES changes, the position of the head element may be adjusted.

Current servo tape drives may have head elements with two modules, with each module having two servo heads.

Thus, the current tape drives are capable of obtaining four YPOS values from a head element. For example, the tape drive may obtain a YPOS value based on each of the servo heads on a right module (YPOS1R and YPOS2R) and each of the servo heads on a left module (YPOS1L and YPOS2L).

Existing methods of adjusting the head element based on YPOS values can create issues when noise is introduced into the PES. Deterioration of a servo pattern within a servo band may cause incorrect YPOS values to be calculated based on incorrect data (noise) being read by the servo heads. These incorrect YPOS values can result in a servo head adjustment that places the servo head outside of the correct data track and onto an incorrect data track. Noise can be accounted for by monitoring the offsets of the YPOS values over a period of time, without noise, to obtain reference offsets. However, when the noise is present at the start of control of the head element, an accurate reference offset cannot be obtained using the YPOS values.

Embodiments of the present disclosure provide for the selection of YPOS values for head adjustment when servo band noise is detected by one of the servo heads. Further embodiments provide for safe write procedures when noise is detected by two servo heads reading from the same servo band. Embodiments provide for head adjustment that prevents previously recorded data from being overwritten. Embodiments provide for head adjustment that results in the correct placement of the head element or, at worst, placement of the head in a location that does not contain previously recorded data.

Sequential access tape drives are characterized by sequentially writing data instead of jumping to different locations on the tape. Thus, when writing data to a track on tape, it is known where the previously written data is located in reference to the current track. Data tracks are generally arranged from outside of a data band to the inside of a data band. Generally, a tape drive will write on a data track in a forward direction from beginning of tape to end of tape, and then will adjust the y-position of the head element across the linear tape and write to a different data track in the backward direction from end of tape to beginning of tape. Each writing from beginning of tape to end of tape, or end of tape to beginning of tape, may be called a wrap. Given the sequential order of each track, it is known which direction from the current track contains a track with previously written data and which direction contains a track that has not been written to yet. Further, it may be known which direction contains a track with previously written data based on the direction of the current write.

In embodiments, the tape drive obtains four YPOS values (YPOS1R, YPOS1L, YPOS2R, and YPOS2L) using the four servo heads of the head element. If noise is detected by one of the servo heads at a given servo band, the YPOS values associated with the servo band will be different. One of the YPOS values may be selected for calculating the PES, such that the head element is prevented from being positioned over previously written data. It may be determined that noise has been detected if the difference between YPOS values at one of the servo bands exceeds a threshold. For example, if |YPOS1L−YPOS1R|>Threshold, it may be determined that one of YPOS1L and YPOS1R has noise, but it may be unknown which is based on noise. YPOS1L or YPOS1R may be selected for calculating the PES, or otherwise determining an adjustment for the position of the head element, such that data will be written to the correct track or a track that does not contain valid previously written data. In some embodiments, the selection of the YPOS value may be based on the direction of the current write, because it is known where valid previously written data exists in relation to the current track when the direction of the write is known. After adjusting the head element, it may be determined that the head was incorrectly adjusted. However, because previously written data was not overwritten, the current write can be retried without loss of data.

If noise is present in both YPOS values for a servo band, the noise may not be detected by comparing the YPOS values for the servo band. In some embodiments, when noise is not identified by comparing the YPOS values for a given data band, the offsets calculated based on the YPOS values may be compared to a to a predetermined reference offset to identify potential noise. For example, it is possible that noise exists in one of the servo bands if the difference between the offset calculated based on the YPOS values and the reference offset is greater than a predetermined threshold value. If the difference is greater than the threshold, there may be noise in the YPOS values or the reference offset may be incorrect, for example, due to physical change in the tape. It may be determined whether to use the YPOS values to adjust the position of the head element using a PES such that previously written data will not be overwritten if the YPOS values are incorrect. The determination may be based on the direction of the current write and which offset is larger between the offset based on the YPOS values and the reference offset.

Embodiments of the present disclosure provide an improvement over existing servo tape drives by preventing the writing of data over previously written data in the presence of noise detected from one of the servo bands. Embodiments allow for the writing of data to tape in the presence of noise, but provide that the writing will occur on the correct track or a track without previously written data.

Figure 1:
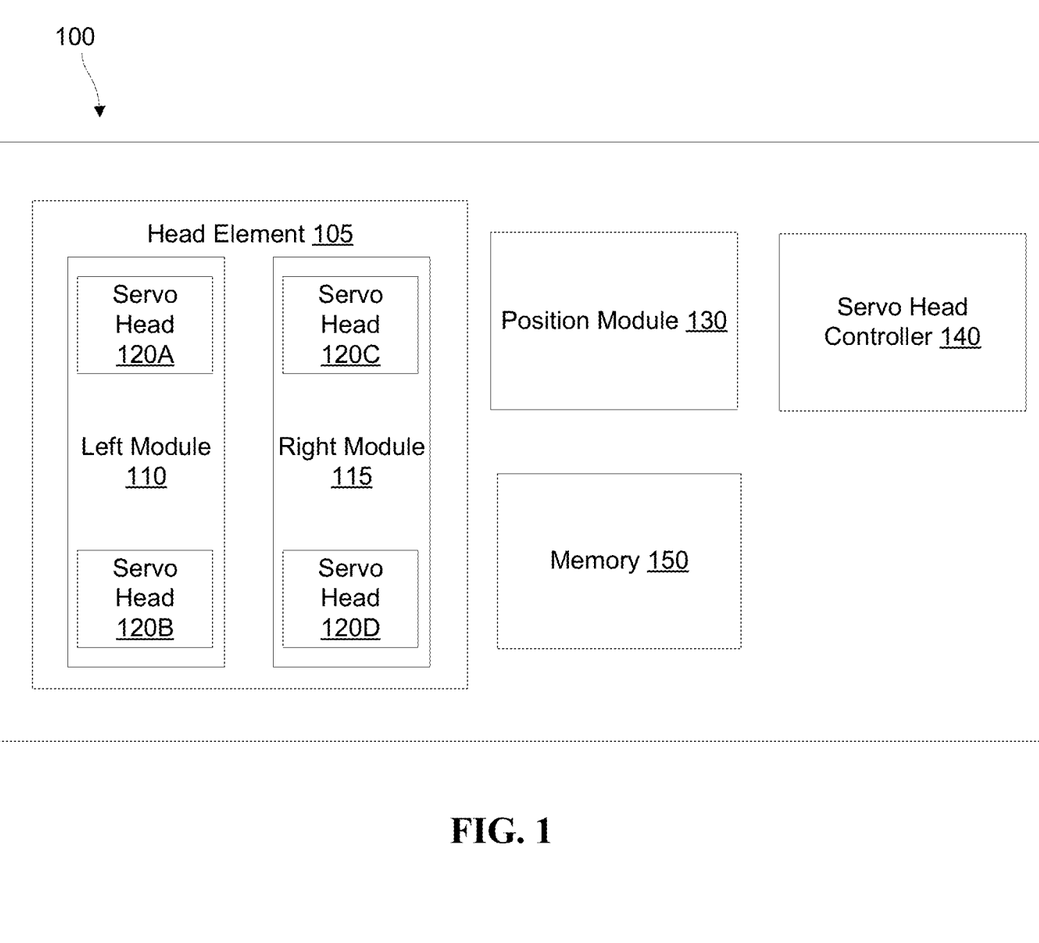
FIG. 1 depicts a block diagram of a tape drive system, according to some embodiments.

FIG. 1 is a block diagram illustrating components of a tape drive 100, according to one illustrative embodiment. The tape drive 100 is a data storage device that reads and writes data on a magnetic tape through magnetoresistance, thin-film induction, or any other type of data encoding to a magnetic tape. The tape drive 100 includes a head element 105, a position module 130, a servo head controller 140, and a memory 150. In some embodiments, the tape drive 100 is communicatively coupled to the computer system of FIG. 5.

Head element 105 is a component of tape drive 100 that read and writes data to linear tape. Head element 105 includes a left module 110 and a right module 115. Left module 110 has two servo heads 120A-B and right module 115 has two servo heads 120C-D. In one embodiment, the linear tape is a magnetic tape medium with a two-dimensional surface. An x dimension runs along the length of the tape, and a y dimension runs across the width of the tape. The linear tape includes servo bands which are encoded along the edges of each data band on the linear tape. For example, a first servo band may be encoded above a data band on the linear tape and a second servo band may be encoded below the data band on the linear tape. These servo bands provide reference data that can be read by servo heads 120A-D as the head element 105 accesses data tracks in the data band on the linear tape. The position information read by the servo heads can be used by the tape drive 100 to determine the position of the head in relation to data tracks on the linear tape. For example, this information can be used to instruct the tape drive 100 where to position the head element to write data to, or read data from, a particular track of data on a linear tape.

Position module 130 is a component of the tape drive 100 that is configured to determine YPOS values based on signals picked up by the servo heads in relation to servo bands on the linear tape. The position module 130 may be communicatively coupled to servo heads 120A-D. It should be noted that each servo head can have a corresponding position module 130. In some embodiments, position module 130 is a part of servo heads 120A-D. In some embodiments, the position module is an application-specific integrated circuit (ASIC) or other processing circuit.

Servo head controller 140 is a component of the tape drive 100 which determines, based on YPOS values, adjustments to make for the head element 105. For example, the servo head controller 140 may obtain YPOS values from position module 130 and calculate a PES in accordance with the methods described herein. Servo head controller 140 may be an ASIC or other processing circuit. In some embodiments, position module 130 and servo head controller 140 may be embodied in the same processing circuit.

Memory 150 is a component of the tape drive 100 that stores data that can be retrieved by the tape drive 100 to determine that an adjustment is needed. Memory 150 can include computer system readable media in the form of volatile memory, such as main memory (e.g., primary RAM) or cache memory. Memory 150 can also include non-volatile memory, such as a hard drive, flash memory, solid state memory, etc. Information related to the YPOS data retrieved by the servo channels 115A-D can be stored in and retrieved from memory 150. Factory head position calibration data and other hardware information, which are established during the manufacturing process of the tape drive, can also be stored and retrieved through memory 150. The servo head position calibration data provides a reference point to determine the servo head positions relative to each other. Tape drive 100 may further store information about tape read from a cartridge memory of a tape cartridge.

Figure 2:
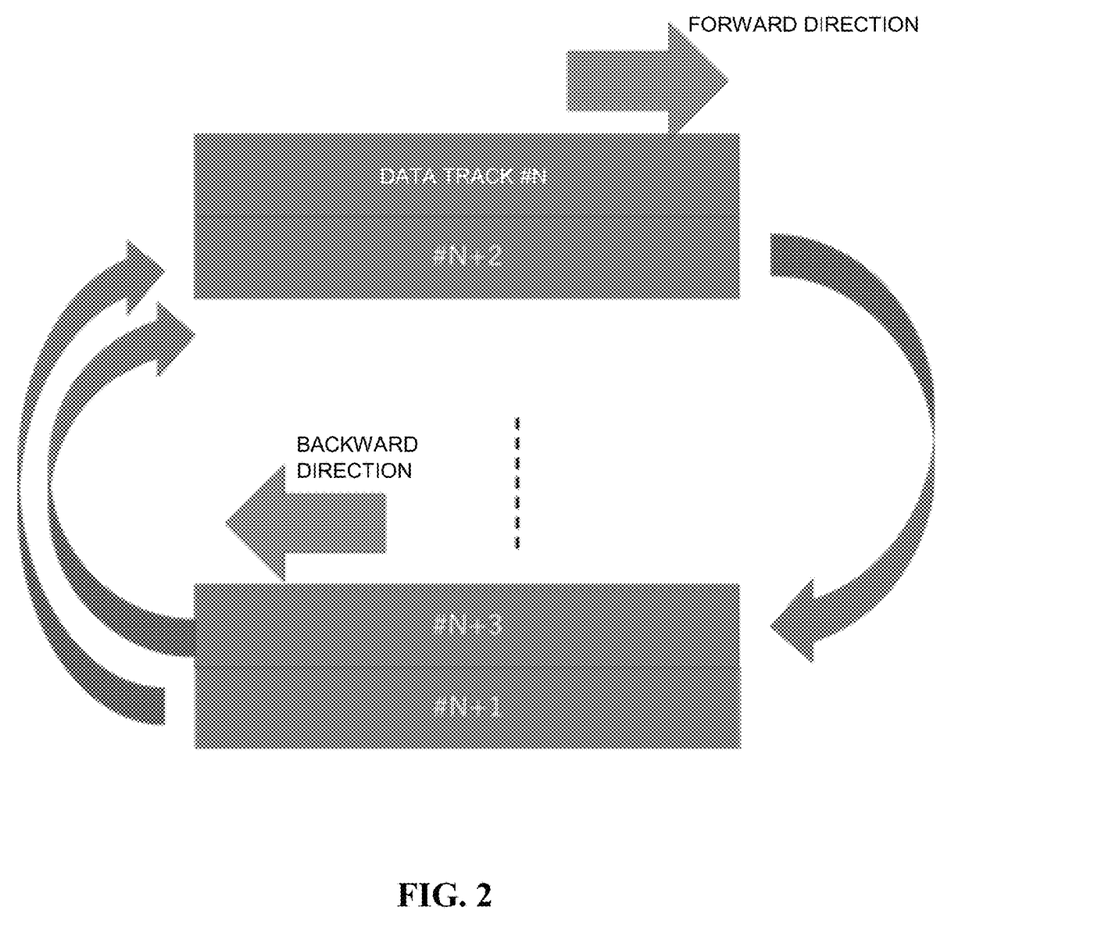
FIG. 2 depicts an arrangement of data tracks within a data band, according to some embodiments.

FIG. 2 depicts an example arrangement of data tracks within a data band and the order in which they are written. In the depicted example, the tape drive writes to data track # N in the forward direction, then writes to data track # N+1 in the backward direction, then writes to data track # N+2 in the forward direction, and then writes to data track # N+3 in the backward direction. The example arrangement is consistent with common servo tape storage arrangements where the data tracks are written from the outside of a data band to the inside of the data band and successive tracks are written in opposite directions. The example arrangement depicted does not show a complete arrangement. For example, there are data tracks between data track # N+2 and # N+3 which are written after writing to data track # N+3, and there may be tracks above data track # N and below data track # N+1 which are written to prior to the writing of data track # N. In the depicted example, the writing that occurs on data tracks # N and # N+2 may be considered even wraps, while the writing that occurs on data tracks # N+1 and # N+3 may be considered odd wraps.

As depicted in FIG. 2, if you are writing in the forward direction or even wrap (e.g., data track # N+2), there is previously written data above the current track (e.g., data track # N), and if you are writing in the backward direction or odd wrap (e.g., data track # N+3), there is previously written data below the current track (e.g., data track # N+1). Thus, for the example arrangement, if the direction of the write is known, it is also known which direction has an adjacent track with previously written data.

When there is noise detected in one of the servo bands, it can cause the tape drive to adjust the position of the head such that it is moved to an adjacent track. If the adjacent track contains previously written data, this data may be overwritten before the tape drive detects the error. Thus, rules can be provided that allow for adjustment of the head element such that it will be written on the correct data track or a data track without previously written data in the presence of noise detected from the servo heads.

It should be noted that the arrangement of data tracks depicted in FIG. 2 is for example purposes only, and other arrangements are contemplated within the scope of the present disclosure. For example, embodiments of the present disclosure could also apply to an arrangement where data tracks are written from the middle of a data band to the outside of the data band.

Figure 3:
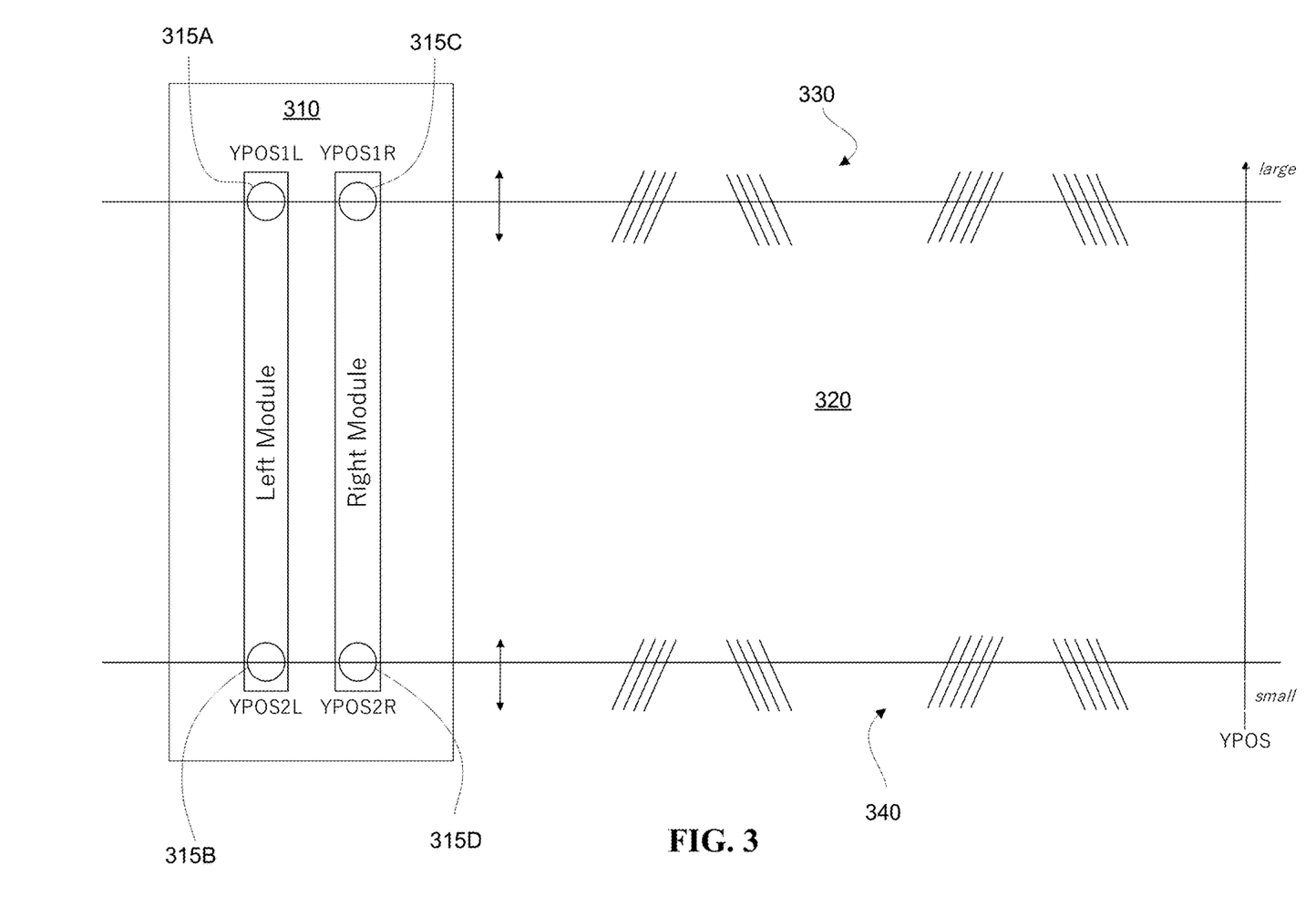
FIG. 3 depicts an example arrangement of a head element over a data band on linear tape, according to embodiments.

FIG. 3 shows an example arrangement of a head element 310 over a data band 320 on linear tape. Head element 310 is placed over a data band 320 with servo heads 315A-D positioned on servo bands 330 and 340, above and below the data band. The left module contains servo head 315A for reading servo band 330 above data band 320 and servo head 315B for reading servo band 340 below the data band 320. The right module contains servo head 315C for reading servo band 330 above data band 320 and servo head 315D for reading servo band 340 below the data band 320.

As the tape passes by head element 310, the servo heads 315A-D read patterns on servo bands 330 and 340 to determine YPOS values. In the depicted example, the YPOS values determined based on the data from servo band 330 are identified as YPOS1L for data read by servo head 315A and YPOS1R for data read by servo head 315C. Similarly, the YPOS values determined based on the data from servo band 340 are identified as YPOS2L for data read by servo head 315B and YPOS1R for data read by servo head 315C. The specific labels (YPOS1L, YPOS1R, YPOS2L, YPOS2R) are used for explanatory purposes and are not intended to limit the disclosure.

FIG. 3 depicts an example timing-based servo pattern on servo bands 330 and 340, but any patterns or data that could be read by servo heads for identifying YPOS values could be used according to embodiments of the present disclosure.

Figure 4:
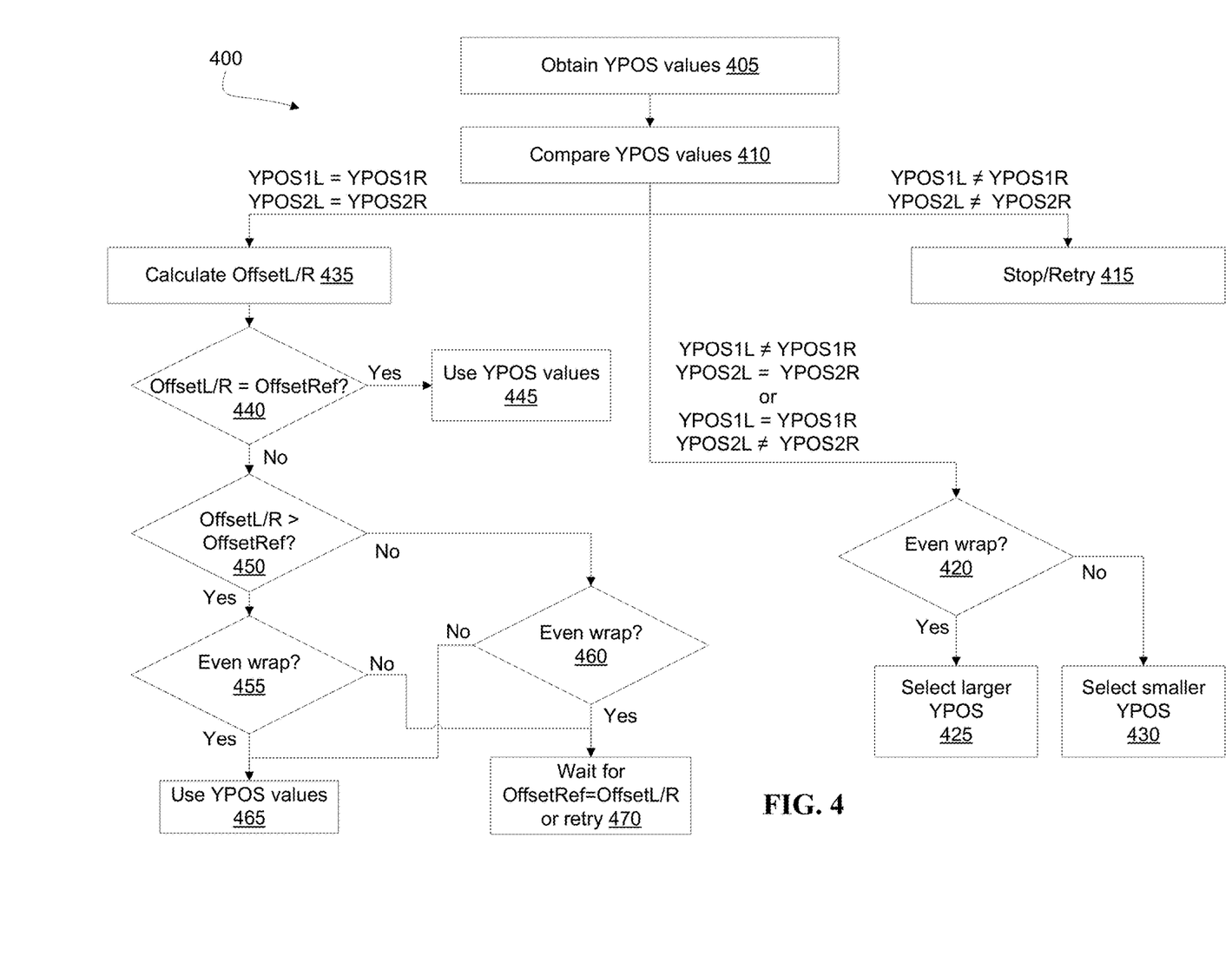
FIG. 4 depicts a flow diagram of a method for handling servo adjustment of a head element of a tape drive during a write to linear tape, according to some embodiments.

FIG. 4 is a flow diagram of an example method 400 for a tape drive handling servo adjustment of a head element during a write to linear tape. Example method 400 assumes a tape drive configured to write from outside of a data track to inside of the data track and with even wraps on the upper side of the data track and odd wraps on the lower side of the data track, such as that described in reference to FIG. 2.

At block 405, YPOS values (YPOS1L, YPOS2L, YPOS1R, YPOS2R) are obtained based on data from four servo heads on a head element as linear tape is run by the head element. In some embodiments, each servo head reads a pattern written into a servo channel and this data is converted into a YPOS value. This conversion may be performed by an ASIC or other processing circuit. In other embodiments, the conversion may occur in a computing system connected to the tape drive such as, for example, computer system 401 in FIG. 4. In other embodiments, the YPOS values may be directly encoded in the servo channel and read by the servo head. Any method of generating YPOS values could be used in accordance with embodiments of the present disclosure. While reference is made herein to having four YPOS values for a head element, embodiments of the present disclosure could apply to a tape drive configured to obtain more YPOS values. For example, a head element could be configured to have three servo heads for reading from each servo channel.

At block 410, the YPOS values corresponding to each servo channel are compared. For example, the YPOS values based on the servo channel above the data channel (YPOS1L and YPOS1R) may be compared and the YPOS values based on the servo channel below the data channel may be compared (YPOS2L and YPOS2R). In some embodiments, the comparison of YPOS values includes a determination of whether the YPOS values are equal. In some embodiments, the comparison of YPOS values may involve identifying the difference between the values and determining whether the difference exceeds a predetermined threshold value. In the following description of FIG. 4, the terms equal (=) and not equal (≠) will be used, however, it is to be understood that equal could be the difference in values being less than a predetermined threshold and not equal could be the difference in values being greater than a threshold, in some embodiments.

If the YPOS values are not equal for both servo channels (i.e., the YPOS values for the top servo channel are not equal and the YPOS values for the lower servo channel are not equal), the tape drive may stop and retry the write, per block 415. When the YPOS values are not equal for both servo channels, it may be unknown whether it is safe to write, either in the present position of the head element or an adjusted position. For example, if YPOS1L YPOS1R and YPOS2L YPOS2R, the tape drive may stop the current write attempt and retry.

If, at block 410, the YPOS values are equal for one servo channel and not equal for the other servo channel, it may be determined that one of the servo channels has noise and the method may proceed to block 420. At block 420, it is determined whether the current wrap is an even wrap. If the wrap is an even wrap, the larger YPOS value, from the unequal values, is selected for use determining an adjustment for the position of the head element. In some embodiments, using the larger YPOS value for determining the adjustment includes using the larger YPOS value in calculating the PES.

For example, if YPOS1L>YPOS1R and YPOS2L=YPOS2R, it may be determined that there is noise in the servo channel above the data band. However, the YPOS value that contains the noise may be unknown. If the incorrect YPOS value is used for the PES from YPOS1L and YPOS1R, the head element may be incorrectly adjusted, possibly to a position for writing to an adjacent data track. Therefore, the YPOS value may be selected such that any adjustment, relative to selecting the other YPOS value, takes place in the direction that does not contain previously written data. In the case of an even wrap, YPOS1L is used to calculate the PES, such that any adjustment takes place in the downward direction relative to an adjustment using YPOS1R. In the case of an odd wrap, YPOS1R is used to calculate the PES, such that any adjustment takes place in the upward direction relative to using YPOS1L.

At block 410, if it is determined that the YPOS values are equal for each servo channel, an offset based on the YPOS values may be calculated, per block 435. The offset may be calculated as the difference in YPOS values for one of the modules of the head element. For example, an offset for the left module may be calculated as OffsetL=YPOS1L−YPOS2L. Given that YPOS1L=YPOS1R and YPOS2L=YPOS2R, their offsets will also be equal and referred to here as OffsetL/OffsetR. Per block 440, it is determined whether OffsetL/OffsetR is equal to a predetermined reference offset value (OffsetRef). OffsetRef may be determined during the manufacturing process for the linear tape. In some embodiments, OffsetRef may be stored in cartridge memory for a tape cartridge and the tape drive may read OffsetRef off of the cartridge memory after the tape cartridge is loaded in the tape drive. OffsetRef may be stored on a memory on the tape drive or may be stored remotely.

At block 440, if it is determined that OffsetL/R equals OffsetRef, it may be determined that the servo channels do not contain noise and the YPOS values may be used to calculate the PES, per block 445. At block 440, if it is determined that OffsetL/R does not equal OffsetRef, it may be determined whether OffsetL/R is greater than OffsetRef, per block 450.

At block 450, if it is determined that Offset L/R is greater than OffsetRef, it is determined whether the current wrap is an even wrap, per block 455. At block 455, if the wrap is an even wrap, the YPOS values are used to calculate the PES, per block 465. At block 455, if the wrap is an odd wrap, the tape drive continues to obtain YPOS values and waits for OffsetRef to equal OffsetL/R, or retries, per block 470.

At block 450, if it is determined that Offset L/R is less than OffsetRef, it is determined whether the current wrap is an even wrap, per block 460. At block 460, if the wrap is an odd wrap, the YPOS values are used to calculate the PES, per block 465. At block 460, if the wrap is an odd wrap, the tape drive continues to obtain YPOS values and waits for OffsetRef to equal OffsetL/R, or retries, per block 470.

Figure 5:
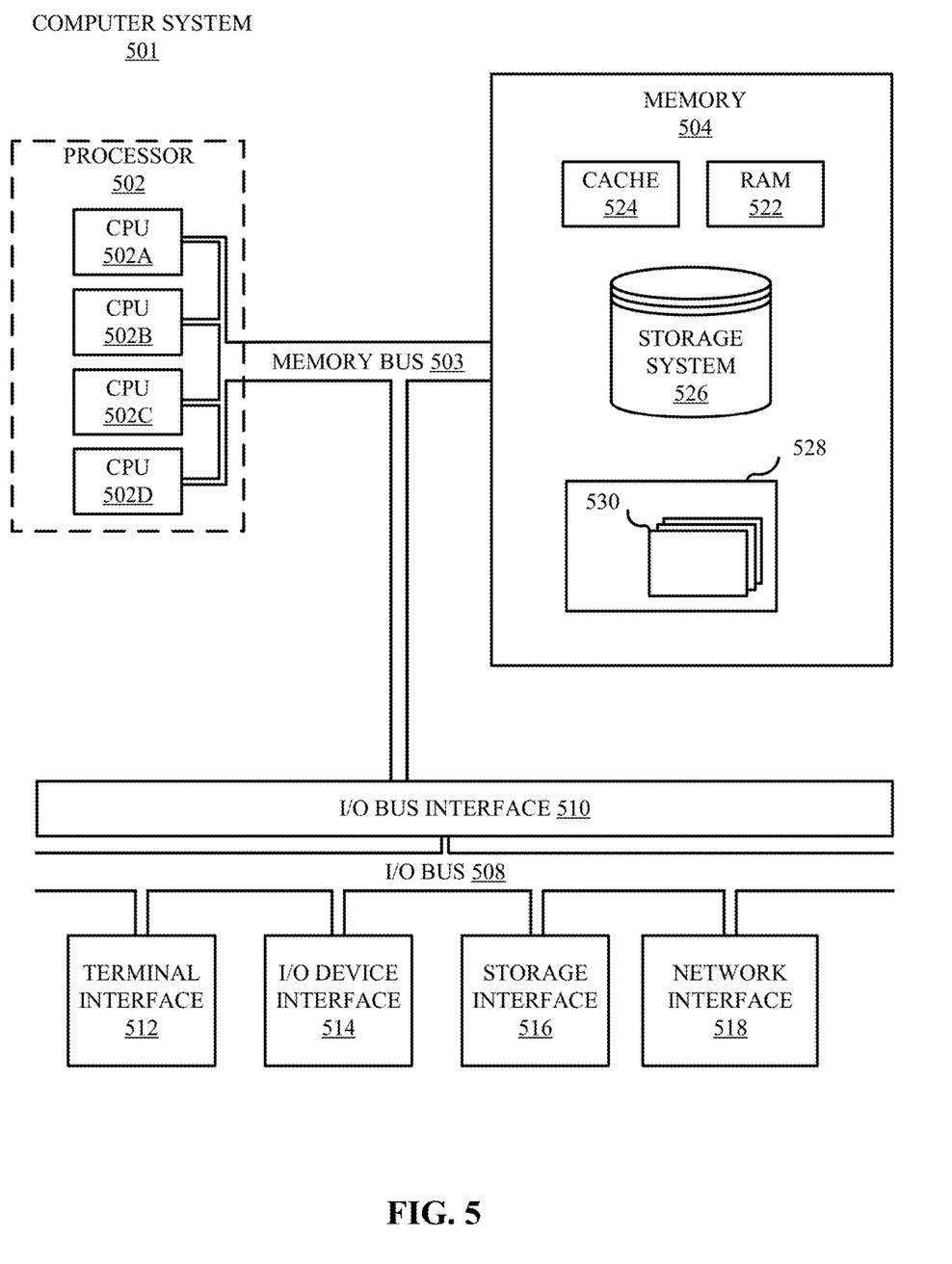
FIG. 5 depicts a block diagram of a computer system, according to some embodiments.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive" or a magnetic tape drive. Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments. System memory 504 can include the tape drive 100 shown in FIG. 1.

Although the memory bus 503 is shown in FIG. 4 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 5401 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

In some embodiments, the modules 530 may include instructions that perform the steps of the process, such as process 400 shown in FIG. 4.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlling a head element of a tape drive, the method comprising:
   identifying, during a first wrap, a first y-position (YPOS) value based on a first servo band, a second YPOS value based on the first servo band, a third YPOS value based on a second servo band, and a fourth YPOS value based on the second servo band;
   determining, based on the first YPOS value and the second YPOS value, that noise is present in the first servo band;

determining, based on the third YPOS value and the fourth YPOS value, that noise is not identified in the second servo band;

selecting one of the first YPOS value and the second YPOS value based on a direction of the first wrap; and performing a control adjustment for the head element based on the selected one of the first YPOS value and the second YPOS value.

2. The method of claim 1, wherein performing the control adjustment comprises:

calculating a position error signal (PES) based on the selected one of the first YPOS value and the second YPOS value; and adjusting position of the head element based on the calculated PES.

3. The method of claim 1, wherein the determining that noise is present in the first servo band comprises:

calculating a difference between the first YPOS value and the second YPOS value; and determining that the difference exceeds a predetermined threshold.

4. The method of claim 1, wherein the first YPOS is determined based on a signal from a first servo head on a first module of the head element, wherein the second YPOS is determined based on a signal from a second servo head on a second module of the head element, wherein the third YPOS value is determined based on a signal from a third servo head on the first module, and wherein the fourth YPOS value is determined based on a signal from a fourth servo head on the second module.

5. The method of claim 1, wherein the selecting one of the first YPOS value and the second YPOS value comprises selecting a larger of the first YPOS value and the second YPOS value based on the direction of the first wrap being a forward direction, and wherein the selecting one of the first YPOS value and the second YPOS value comprises selecting a smaller of the first YPOS value and the second YPOS value based on the direction of the first wrap being a backward direction.

6. The method of claim 1, further comprising:

identifying, during a second wrap, a first set YPOS values based on a first servo band and a second set of YPOS values based on a second servo band;

determining that noise is not detected based on comparing YPOS values in the first set and comparing YPOS values in the second set;

calculating an offset based on the first set of YPOS values and the second set of YPOS values;

determining that there is noise in at least one of the servo bands by comparing the offset in YPOS values to a reference offset; and determining to not perform a control adjustment using the YPOS values based on the determination that there is noise and a direction of the first wrap.

7. The method of claim 1, wherein the method is performed by an application-specific integrated circuit of the tape drive.

8. A tape drive system comprising:

a head element having a first servo head configured to read information from a first servo band, a second servo head configured to read information from the first servo band, a third servo head configured to read information from a second servo band, and a fourth servo head configured to read information from the second servo band; and one or more processing circuits communicatively coupled to the first servo head, the second servo head, the third servo head, and the fourth servo head, wherein the one or more processing circuits are configured to perform a method comprising:

identifying, during a first wrap, a first y-position (YPOS) value based on a signal from the first servo head, a second YPOS value based on a signal from the second servo head, a third YPOS value based on a signal from the third servo head, and a fourth YPOS value based on a signal from the fourth servo head;

determining, based on the first YPOS value and the second YPOS value, that noise is present in the first servo band;

determining, based on the third YPOS value and the fourth YPOS value, that noise is not identified in the second servo band;

selecting one of the first YPOS value and the second YPOS value based on a direction of the first wrap; and performing a control adjustment for the head element based on the selected one of the first YPOS value and the second YPOS value.

9. The tape drive system of claim 8, wherein performing the control adjustment comprises:

calculating a position error signal (PES) based on the selected one of the first YPOS value and the second YPOS value; and adjusting position of the head element based on the calculated PES.

10. The tape drive system of claim 8, wherein the determining that noise is present in the first servo band comprises:

calculating a difference between the first YPOS value and the second YPOS value; and determining that the difference exceeds a predetermined threshold.

11. The tape drive system of claim 8, wherein the selecting one of the first YPOS value and the second YPOS value comprises selecting a larger of the first YPOS value and the second YPOS value based on the direction of the first wrap being a forward direction, and wherein the selecting one of the first YPOS value and the second YPOS value comprises selecting a smaller of the first YPOS value and the second YPOS value based on the direction of the first wrap being a backward direction.

12. The tape drive system of claim 8, wherein the method further comprises:

identifying, during a second wrap, a first set of YPOS values based on a first servo band and a second set of YPOS values based on a second servo band;

determining that noise is not detected based on comparing YPOS values in the first set and comparing YPOS values in the second set;

calculating an offset based on the first set of YPOS values and the second set of YPOS values;

determining that there is noise in at least one of the servo bands by comparing the offset in YPOS values to a reference offset; and determining to not perform a control adjustment using the YPOS values based on the determination that there is noise and a direction of the first wrap.

* * * * *